United States Patent
Yonezawa et al.

[11] Patent Number: 5,995,009
[45] Date of Patent: Nov. 30, 1999

[54] WARNING APPARATUS FOR AN INJECTION MOLDING MACHINE

[75] Inventors: Shoji Yonezawa, Yokohama; Yukkiang Lau, Funabashi, both of Japan

[73] Assignee: Sumitomo Heavy Industries, Ltd., Japan

[21] Appl. No.: 09/110,209

[22] Filed: Jul. 6, 1998

[30] Foreign Application Priority Data

Jul. 18, 1997 [JP] Japan .................................. 9-193737

[51] Int. Cl.$^6$ ................................................ G08B 21/00
[52] U.S. Cl. ...................... 340/635; 340/679; 425/173; 425/135; 425/169
[58] Field of Search .................................. 340/635, 679, 340/686, 540; 425/135–139, 143, 150, 154, 169–171, 173; 264/40.1, 40.3, 40.5, 40.6

[56] References Cited

U.S. PATENT DOCUMENTS

| | | | |
|---|---|---|---|
| 4,674,053 | 6/1987 | Bannai et al. | 364/476 |
| 4,802,097 | 1/1989 | Tanaka et al. | 364/476 |
| 4,802,834 | 2/1989 | Neko | 425/138 |
| 5,325,287 | 6/1994 | Spahr et al. | 364/146 |
| 5,344,301 | 9/1994 | Kamiguchi et al. | 425/169 |
| 5,640,467 | 6/1997 | Yamashita et al. | 382/181 |

*Primary Examiner*—Daniel J. Wu
*Assistant Examiner*—Sihong Huang
*Attorney, Agent, or Firm*—Lorusso & Loud

[57] ABSTRACT

A warning apparatus for an injection molding machine includes a detection device for detecting an operation performed by an operator of the injection molding machine; a warning section for warning the operator in response to a detection signal from the detection device; and a cancellation section for canceling the warning when the operator correctly operates the injection molding machine. When there is a possibility that an operator incorrectly operates the injection molding machine, a warning is generated by the warning section. Therefore, the operator is prevented from incorrectly operating the injection molding machine. Thus, breakage of the mold unit is avoided. Further, since the cancellation section is provided, the operator does not have to perform any operation for canceling the warning, so that work efficiency is improved.

3 Claims, 2 Drawing Sheets

WARNING APPARATUS FOR AN INJECTION MOLDING MACHINE

BACKGROUND OF THE INVENTION

1. Field of the Invention

The present invention relates to a warning apparatus for an injection molding machine.

2. Description of the Related Art

Conventionally, an injection molding machine has an injection unit. The injection unit has a heating cylinder in which a screw is disposed rotatably and in an advancingly-retreatively movable manner. Drive means rotates and advances or retreats the screw. In a metering step, the screw is retreated while being rotated in a regular direction, so that resin is supplied from a hopper and heated in the heating cylinder, and molten resin is accumulated in a space located ahead of a screw head. In an injection step, the screw is advanced so as to inject the molten resin from an injection nozzle.

A mold unit is disposed in front of the injection unit. The mold unit includes a stationary platen, a movable platen, a stationary mold, a movable mold, and a mold clamping apparatus. The mold clamping apparatus advances and retracts the movable platen in order to bring the movable mold into contact with the stationary mold and separate the movable mold from the stationary mold, thereby performing mold closing operation, mold clamping operation, and mold opening operation.

During the period of injection molding, an operator must perform attachment and removal of the stationary and movable molds to and from the stationary and movable platens (hereinafter referred to as "mold exchange operation"), adjustment of the operation of the mold unit, adjustment of the temperature of the mold unit, heating of the heating cylinder, and charging of resin into the hopper.

Also, during the period of injection molding preparation, the operator must perform an operation for increasing the temperature of the mold unit, purging, exchange of resins, change of colors, removal of resin remaining within the heating cylinder, setting of molding conditions suitable for the molding unit, and starting up of molding.

However, since the operator performs various kinds of work or operation in the conventional injection molding machine, if the operator incorrectly operates the injection molding machine, the molding unit may be broken.

SUMMARY OF THE INVENTION

An object of the present invention is to solve the above-mentioned problems in the conventional injection molding machine and to provide a warning apparatus for an injection molding machine which can prevent an operator from incorrectly operating the injection molding machine, thereby preventing breakage of a molding unit.

To achieve the above object, a warning apparatus for an injection molding machine according to the present invention comprises detection means for detecting an operation performed by an operator of the injection molding machine; warning means for warning the operator in response to a detection signal from the detection means; and cancellation means for canceling the warning when the operator correctly operates the injection molding machine.

In this case, when there is a possibility that an operator incorrectly operates the injection molding machine, a warning is generated by means of the warning means. Therefore, the operator is prevented from incorrectly operating the injection molding machine. Thus, breakage of the mold unit is avoided.

Further, since the cancellation means is provided, the operator does not have to perform any operation for canceling the warning, so that work efficiency is improved.

In another warning apparatus for an injection molding machine according to the present invention, the warning means includes a display section for performing display and display means for operating the display section based on a detection signal from the detection means in order to display a warning for the operator.

The cancellation means cancels the display when the operator correctly operates the injection molding machine.

In this case, when there is a possibility that an operator incorrectly operates the injection molding machine, a warning is displayed by means of the display means. Therefore, the operator is prevented from incorrectly operating the injection molding machine. Thus, breakage of the mold unit is avoided.

Further, since the cancellation means is provided, the operator does not have to perform any operation for canceling the display, so that work efficiency is improved.

Still another warning apparatus for an injection molding machine according to the present invention includes operation judging means for making judgment as to whether the injection molding machine is operated correctly, based on control signals from the injection molding machine and operation signals from operation means. The cancellation means cancels the warning based on the result of judgment made by the operation judging means.

In still another warning apparatus for an injection molding machine according to the present invention, the control signals are sent from at least one of an injection unit and a mold unit.

BRIEF DESCRIPTION OF THE DRAWINGS

The structure and features of the warning apparatus for an injection molding machine according to the present invention will be readily appreciated as the same becomes better understood by referring to the drawings, in which.

DESCRIPTION OF THE PREFERRED EMBODIMENT

An embodiment of the present invention will next be described in detail with reference to the drawings.

Figure 1:
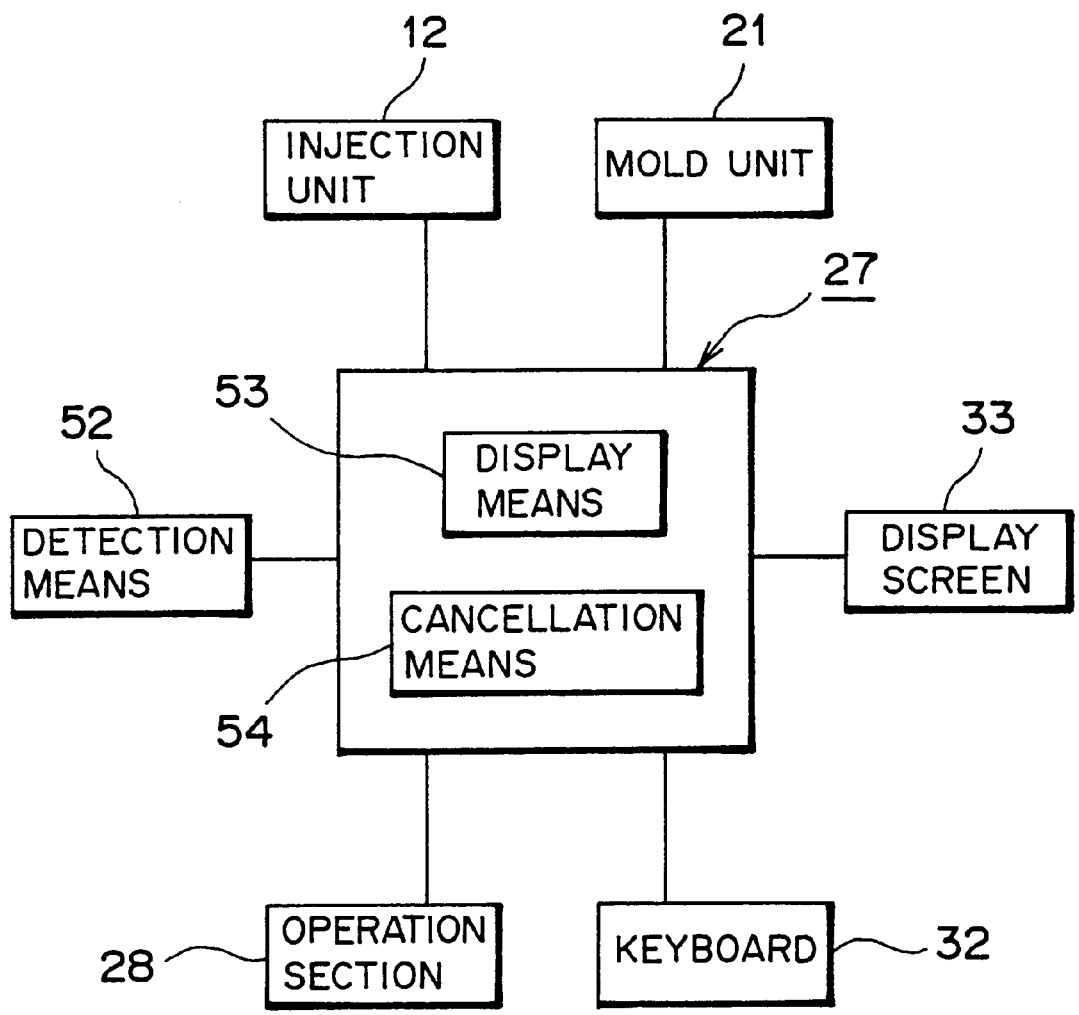
FIG. 1 is a block diagram of a warning apparatus for an injection molding machine according to an embodiment of the present invention.
Figure 2:
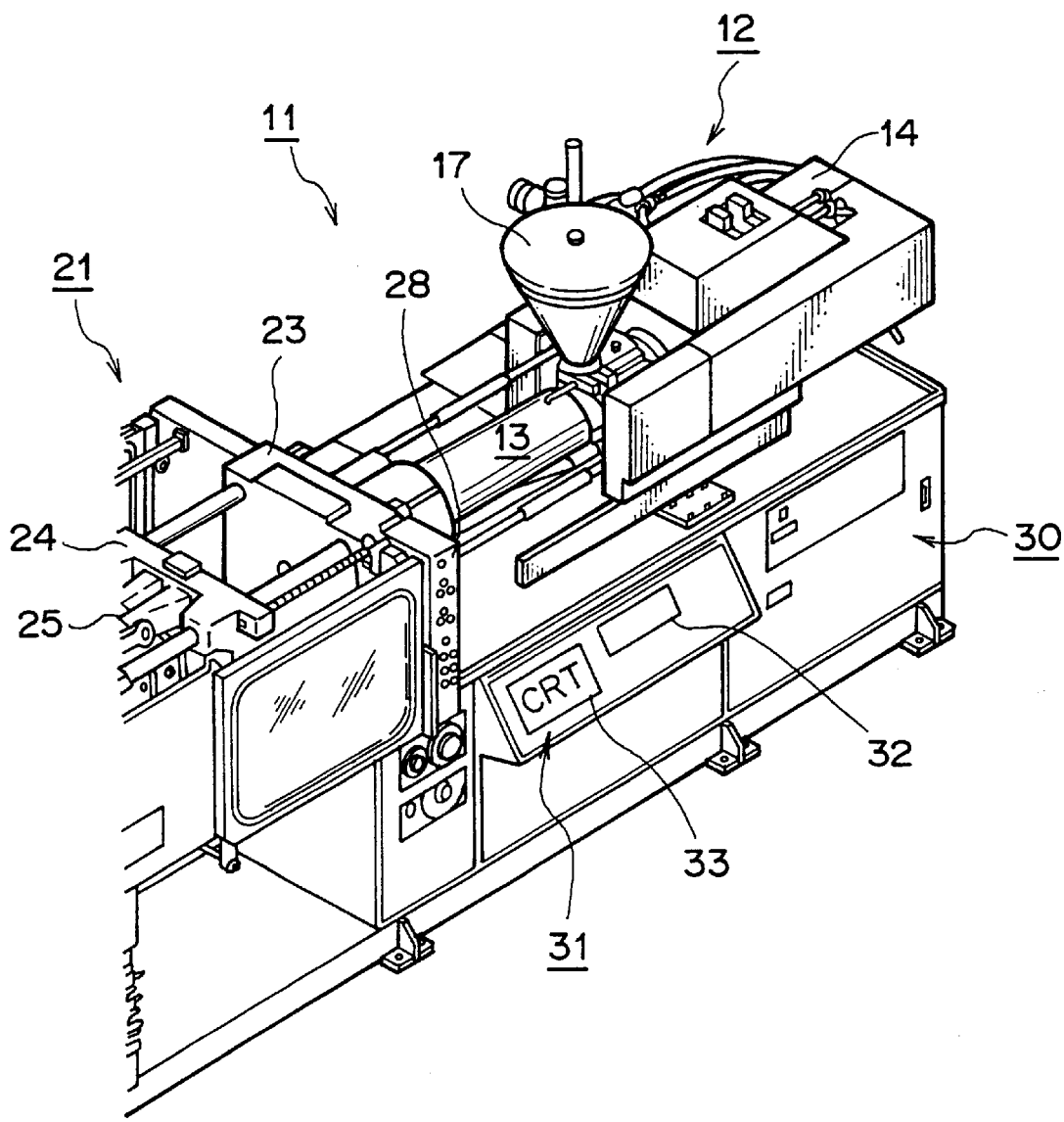
FIG. 2 is a perspective view of the injection molding machine according to the embodiment of the present invention.

FIG. 1 is a block diagram of a warning apparatus for an injection molding machine according to the embodiment of the present invention; and FIG. 2 is a perspective view of the injection molding machine according to the embodiment of the present invention.

In FIGS. 1 and 2, numeral 11 denotes an injection molding machine, and numeral 12 denotes an injection unit. The injection unit 12 has a heating cylinder 13 in which an unillustrated screw is disposed rotatably and in an advancingly-retreatively movable manner. Drive means 14 rotates, and advances or retreats the screw. In a metering step, the screw is retreated while being rotated in a regular direction, so that resin is supplied from a hopper 17 and heated in the heating cylinder 13, and molten resin is accumulated in a space located ahead of an unillustrated screw head. In an injection step, the screw is advanced so as to inject the molten resin from an unillustrated injection nozzle.

A mold unit 21 is disposed in front (on the left side in FIG. 2) of the injection unit 12. The mold unit 21 includes a stationary platen 23, a movable platen 24, an unillustrated stationary mold attached to the stationary platen 23, an unillustrated movable mold attached to the movable platen 24, and a mold clamping apparatus 25. The mold clamping apparatus 25 advances and retracts the movable platen 24 in order to bring the movable mold into contact with the stationary mold and separate the movable mold from the stationary mold, thereby performing mold closing operation, mold clamping operation, and mold opening operation.

Further, a frame 30 is disposed under the injection unit 12, and a control panel 31 is disposed on the front face of the frame 30. On the control panel 31 are disposed an input keyboard 32 with which an operator sets molding conditions and the like and a display screen (CRT) 33 serving as a display section for displaying the molding conditions and the like. Further, there is provided a controller 27. When the operator operates an operation section 28 and the keyboard 32, the controller 27 generates predetermined signals to operate the injection unit 12 and the mold unit 21. That is, in order to perform injection molding, the controller 27 operates the injection unit 12 and the mold unit 21 based on the molding conditions and the like that the operator has set through operation of the keyboard 32.

During the period of injection molding, the operator must perform mold exchange operation, adjustment of the operation of the mold unit 21, adjustment of the temperature of the mold unit 21, heating of the heating cylinder 13, and charging of resin into the hopper 17.

Also, during the period of injection molding preparation, the operator must perform an operation for increasing the temperature of the mold unit 21, purging, exchange of resins, change of colors, removal of resin remaining within the heating cylinder 13, setting of molding conditions suitable for the molding unit 21, and starting up of molding.

However, if the operator forgets to change the molding condition after attaching new stationary and movable molds to the stationary platen 23 and the movable platen 24, respectively, through the mold exchange operation, overcharging (over-pack), short shot, or a like problem occurs with the result that the mold unit 21 is broken, or errors are introduced in the mold opening/closing speed, the mold opening stroke, and the like, resulting in generation of galling in the mold unit 21, or breakage of an unillustrated three-plate link.

Further, if the operator forgets to perform purge after, for example, resin exchange or color change, the molten resin remaining within the heating cylinder 13 degrades and decomposes. As a result, if injection is performed without change of the setting values for injection pressure and injection speed, over-pack occurs, and the mold unit 21 is broken.

Further, in a mold unit of a particular type, the temperature of a mold and molding state may become unstable at the startup of a first molding cycle. Therefore, if a subsequent molding cycle is performed while the molding conditions for the first molding cycle are maintained unchanged, over-pack may occur.

The above-described problems are taken into consideration in the present embodiment. That is, detection means 52 formed of a switch or the like is disposed on the stationary platen 23 and the movable platen 24 in order to detect an operation performed by the operator of the injection molding machine 11. A detection signal generated by means of the detection means 52 is sent to the controller 27. Display means 53 of the controller 27 generates a display signal based on the detection signal and sends the display signal to the display screen 33. The display screen 33 displays a warning message or the like that calls the operator's attention based on the display signal. The display screen 33 and the display means 53 constitute warning means.

Subsequently, when the warned operator correctly operates the injection molding machine 11, cancellation means 54 of the controller 27 cancels or erases the warning message or the like on the display screen 33 based on control signals from the injection unit 12 and the mold unit 21 and operation signals from operation means such as the operation section 28 and the keyboard 32.

In order to perform such cancellation operation, unillustrated operation judging means provided within the controller 27 makes judgment as to whether the injection molding machine 11 has been correctly operated, based on the control signals and operation signals, and sends the result of judgment to the cancellation means 54.

For example, when the operator removes the stationary and movable molds from the stationary platen 23 and the movable platen 24, respectively, and attaches new stationary and movable molds to the stationary platen 23 and the movable platen 24, respectively, thereby performing mold exchange operation, the detection means 52 detects this mold exchange operation and outputs a detection signal. When the detection signal is sent to the controller 27, the display means 53 of the controller 27 operates the display screen 33 in order to display a warning message that calls the operator's attention to confirm whether the molding conditions are suited to the newly attached stationary and movable molds. In the present embodiment, the detection means 52 formed of a switch or the like detects the fact that the mold exchange operation has been performed. However, the performance of the mold exchange operation can be detected through the fact that an unillustrated power supply has been turned on or the fact that the thickness of the mold has been adjusted.

When the performance of the mold exchange operation is detected, the mold opening force is decreased automatically (e.g., to 30% or less the usual force) during the injection molding preparation period. Further, if the mold opening operation is not performed until the molds are opened to the limit during the period of injection molding preparation, operation of the injection molding machine 11 can not be started in any modes (manual, semi-automatic, and full-automatic).

In such a case, a warning message "Please check the mold opening stroke and whether foreign matter remains within the mold" or a like message is displayed on the display screen 33.

When the mold exchange operation has not been performed, the display of the message can be canceled or erased through operation of an on/off key provided on the display screen 33.

Further, when injection molding is not started after a preset time (e.g., 5 minutes) has elapsed after completion of temperature increase of the mold unit 21, a warning message "Please perform purge" or a like message is displayed on the display screen 33. When another preset time (e.g., 30 minutes) has elapsed, the temperature of the heating cylinder 13 is automatically decreased.

Further, at the startup of the first molding operation, the molding conditions are automatically changed such that injection molding is performed with a shortened metering stroke and a reduced pressure. At the startup of the second or subsequent molding operation, ordinary molding conditions are automatically set. The mode in which molding conditions are changed at the startup of the first molding operation can be turned on or off.

As described above, when there is a possibility that an operator incorrectly operates the injection molding machine 11, a warning is displayed on the display screen 33. Therefore, the operator is prevented from incorrectly operating the injection molding machine 11. Thus, breakage of the mold unit 21 is avoided.

Further, since the controller 27 includes the cancellation means 54 which cancels the warning display when the operator correctly operates the injection molding machine 11 after being warned, the operator does not have to perform any operation such as operation of the keyboard 32 for canceling the warning display, so that work efficiency is improved.

In the present invention, a warning message is displayed on the display screen 33 in order to call the operator's attention. However, the operator's attention may be called through use of a sound output from a speaker or the like, or use of an optical output from a display lamp or the like.

The present invention is not limited to the above-mentioned embodiment. Numerous modifications and variations of the present invention are possible in light of the spirit of the present invention, and they are not excluded from the scope of the present invention.

What is claimed is:

1. A warning apparatus for an injection molding machine comprising:

(a) operation means for operations inclusive of input of operation signals setting molding conditions;

(b) a controller for generating signals for control of the injection molding machine responsive to the molding condition setting signals;

(c) detection means for detecting an operation performed by an operator through said operating means and for generating a detection signal responsive to detection of an operation;

(d) warning means for warning the operator in response to a detection signal from said detection means;

(e) judging means for judging whether the injection molding machine is operated correctly, based on signals from the injection molding machine and on the operation signals; and (f) cancellation means for cancelling the warning when the judging means judges that the operator has correctly operated the injection molding machine.

2. A warning apparatus for an injection molding machine according to claim 1, wherein (a) said warning means includes a display section for performing display and display means for operating said display section based on a detection signal from said detection means in order to display a warning for the operator; and (b) said cancellation means cancels the display when the operator correctly operates the injection molding machine.

3. A warning apparatus for an injection molding machine according to claim 1, wherein the injection molding machine includes a mold unit and an injection unit for charging the mold unit, and signals are sent to the judging means from at least one of the injection unit and the mold unit.

* * * * *